United States Patent
Kiridena et al.

(10) Patent No.: US 9,216,473 B2
(45) Date of Patent: Dec. 22, 2015

(54) CLAMPING AND HEATING APPARATUS FOR JOINING TOOLS

(75) Inventors: Vijitha Senaka Kiridena, Ann Arbor, MI (US); Joy Hines Forsmark, Saint Clair Shores, MI (US); Zhiyong Cedric Xia, Canton, MI (US); Matthew John Zaluzec, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 918 days.

(21) Appl. No.: 13/449,738

(22) Filed: Apr. 18, 2012

(65) Prior Publication Data

US 2013/0276299 A1 Oct. 24, 2013

(51) Int. Cl.

| | |
|---|---|
| *B21J 15/42* | (2006.01) |
| *B21J 15/10* | (2006.01) |
| *B23K 20/12* | (2006.01) |
| *B23K 20/26* | (2006.01) |
| *B21J 15/08* | (2006.01) |
| *B21J 15/02* | (2006.01) |
| *B21J 15/14* | (2006.01) |

(52) U.S. Cl.
CPC ........... *B23K 20/1265* (2013.01); *B21J 15/025* (2013.01); *B21J 15/08* (2013.01); *B21J 15/142* (2013.01); *B21J 15/42* (2013.01); *B23K 20/126* (2013.01); *B23K 20/1235* (2013.01); *Y10T 29/5118* (2015.01); *Y10T 29/52* (2015.01)

(58) Field of Classification Search
CPC ............ B23K 20/1235; B23K 20/126; Y10T 29/5118
USPC .......................................................... 29/34 B
See application file for complete search history.

(56) References Cited

U.S. PATENT DOCUMENTS

| | | | | |
|---|---|---|---|---|
| 5,829,664 | A | * | 11/1998 | Spinella et al. ............ 228/112.1 |
| 6,070,784 | A | * | 6/2000 | Holt et al. .................. 228/112.1 |
| 7,150,389 | B1 | | 12/2006 | Knipstrom et al. |
| 7,404,512 | B2 | * | 7/2008 | Baumann et al. ............ 228/44.3 |
| 9,033,205 | B2 | * | 5/2015 | Castillo et al. ............ 228/112.1 |
| 2004/0020970 | A1 | * | 2/2004 | Palm ......................... 228/112.1 |
| 2008/0083817 | A1 | | 4/2008 | Baumann et al. |
| 2009/0294514 | A1 | | 12/2009 | Babb et al. |

FOREIGN PATENT DOCUMENTS

| | | | |
|---|---|---|---|
| JP | 10-225781 A | * | 8/1998 |
| JP | 2004-154790 A | * | 6/2004 |

(Continued)

OTHER PUBLICATIONS

Machine Translation JP 2004-154790-A, which JP '790 was published Jun. 2004.*

(Continued)

*Primary Examiner* — Erica E Cadugan
(74) *Attorney, Agent, or Firm* — Damian Porcari; Brooks Kushman P.C.

(57) ABSTRACT

A friction stir spot welding tool and a self-piercing riveting tool are disclosed for joining parts. The parts are clamped between a head and anvil support of the friction stir spot welding tool or the self-piercing riveting tool. A plurality of clamping and heating modules are attached to an attachment fixture on the head and the anvil support that heats the area around the pin of the friction stir spot welding tool or self-piercing riveting tool prior to and during the joining operation.

18 Claims, 3 Drawing Sheets

(56) References Cited

FOREIGN PATENT DOCUMENTS

| | | |
|---|---|---|
| JP | 20080221342 A2 | 9/2008 |
| WO | WO-99/39861 A1 * | 8/1999 |

OTHER PUBLICATIONS

Machine Translation JP 10-225781-A, which JP '781 was published Aug. 1998.*

* cited by examiner

CLAMPING AND HEATING APPARATUS FOR JOINING TOOLS

TECHNICAL FIELD

This disclosure relates to an apparatus that clamps and heats the parts to be joined by friction stir spot welding or by self-piercing rivets to reduce the axial load required to plasticize the part material to make a sound joint.

BACKGROUND

Industry is trending towards using more and more lightweight materials such as aluminum alloys to build vehicle body structures as a result of the increasing demand for fuel efficient vehicles. Resistance spot welding is the leading joining technology for steel parts. Resistance spot welding is not the preferred solution for joining aluminum parts because weld quality problems, substantial fixed costs for tooling and welding systems, and high energy demands.

Self-piercing rivets are used in some joining applications where aluminum parts are joined together or with dissimilar parts. However, self-piercing rivets may not be the ideal solution for all aluminum alloys and are relatively costly.

Friction stir spot welding is a technique that is used in production to join aluminum or steel parts together. The use of friction stir spot welding may reduce energy consumption by over 90% compared to resistance spot welding on the same parts. Substantial cost savings can be achieved with the use of friction stir spot welding. However, C-Type gun friction stir spot welding technology tends to be limited to making subassemblies and assemblies having weld points that are located around the periphery of the parts.

One challenge to making friction stir spot welding and self-piercing rivets viable solutions for joining a wider variety of aluminum parts is reducing the large axial load required to plasticize the material. Another challenge for friction stir spot welding is the difficulty of firmly clamping the body elements during joining. In general, friction stir spot welding requires higher loading of the gun compared to welding guns used for resistance spot welding. Load management is a key driver to the implementation of friction stir spot welding technology. A relatively high clamping load is required during friction stir spot welding to maintain proper mixing of plastisized material and to avoid full or partial separation of the parts being welded which may result in a poor weld.

In addition, the wide range of part geometries that can be encountered in automotive production make it difficult to clamp parts together while performing a friction stir spot welding operation.

The above problems and challenges are addressed by this disclosure as summarized below.

SUMMARY

According to one aspect of this disclosure, an apparatus is provided that facilitates joining a plurality of parts together using a joining tool. The apparatus comprises a housing attached to the head of the joining tool, a clamping stylus supported by the housing for engagement with one of the parts at a spaced location from the joining tool, and a heating element attached to the clamping stylus that heats the clamping stylus and the part as the joining tool joins the parts.

According to other aspects of this disclosure, the joining tool may be a friction stir spot welding tool or a self-piercing rivet tool. The housing may define a cavity and the stylus may be attached to a piston that is moveably disposed within the cavity. A spring or a elastic connector may be operatively connected to the piston to bias the stylus into engagement with the part. An insulator may be disposed between the stylus and the piston that thermally insulates the stylus from the piston. The heating element may be an electrical resistance heating element that heats the stylus that in turn heats the part by contacting the part.

According to further aspects of the disclosure, a plurality of the housings may be attached to the head of the joining tool, a plurality of clamping styluses each may be supported by one of the plurality of housings, and a plurality of heating elements each may be attached to one of the styluses. The plurality of styluses may be arrayed to contact the one part in equally spaced locations that are disposed about the joining tool. An anvil may be disposed on the opposite side from the plurality of parts from the clamping stylus. The anvil may further comprise a back-up housing attached to a back-up of the joining tool, an oppositely oriented clamping stylus supported by the back-up housing for engagement with a second one of the parts at a spaced location from the back-up of the joining tool. A heating element may be attached to the oppositely oriented clamping stylus that heats the oppositely oriented clamping stylus and the second one of the parts as the anvil cooperates with the joining tool to join the parts.

According to another aspect of this disclosure, a tool is provided for joining a plurality of parts together. The tool for spin stir spot welding applications includes a spin stir spot welding head having a plurality of clamps that are moved with the welding head to engage a first side of the plurality of parts. A heating element may be provided that heats the first side of the part that is contacted by the clamps. An anvil may be provided that has a plurality of back-up clamps that are moved with the anvil to engage a second side of the plurality of parts and clamp the parts together when the parts are joined together.

According to other aspects of the tool, the heating element may be a first heating element and the anvil may further comprise a second heating element that heats the second side of the plurality of parts. Two or more clamps may be provided that are spaced equidistant from the spin stir spot welding head and two or more back-up clamps may be provided that are aligned with the clamps on the opposite side of the plurality of parts. Six clamps may be provided that are disposed in a circular array around the spin stir spot welding head or the self-piercing rivet tool and six back-up clamps may be provided that are aligned with the clamps on the opposite side of the plurality of parts.

The plurality of clamps may be spring biased into engagement with the first side of the plurality of parts and the back-up clamps may be spring biased into engagement with the second side of the plurality of parts. A clamping force may be applied by each of the plurality of clamps that is less than 10% of a joining force applied by the spin stir spot welding head to the first side of the plurality of parts. A back-up clamping force may be applied by each of the back-up clamps. The back-up clamping force applied by each of the plurality of back-up clamps may be less than 10% of a joining force applied by the anvil to the second side of the plurality of parts.

The tool may further comprise a housing that defines at least one cavity. Each of the clamps may each be attached to one of a first set of pistons that is moveably disposed within each of the cavities. A first set of springs are operatively connected one to each of the first set of pistons to bias the clamps into engagement with the first side of the parts. At least one back-up housing may be provided that defines a cavity in the back-up housing. Each of the back-up clamps may each be attached to one of a second set of pistons that is moveably disposed within each of the cavities. A second set of springs are operatively connected one to each of the second set of pistons to bias the back-up clamps into engagement with the second side of the parts.

According to another aspect of the disclosure, a system is provided for friction stir spot welding a plurality of parts together. The system comprises a friction stir spot welding head disposed to engage a first side of the parts and an anvil disposed on a second side of the parts that is opposite the first side of the parts. Clamping members are disposed around the friction stir spot welding head that engage the first side of the parts. Back-up clamping members are disposed around the anvil to engage the second side of the parts. A heating element is associated with each of the clamping members and each of the back-up clamping members to heat the parts when the clamping members and back-up clamping members engage the parts with the friction stir spot welding head.

According to other aspects of the method, the system may further comprise a power control module that provides power to each of the heating elements. A temperature sensor may be used to provide a feedback signal that is indicative of the temperature of the clamping members and back-up clamping members to the power control module. The power control module may adjust the power provided to the heating elements based upon the feedback signal. The power control module may provide a control signal to a controller of the system that is used by the system to control the operation of the friction stir spot welding head.

The above aspects and other aspects of the disclosure will be better understood in view of the attached drawings and the following detailed description of the illustrated embodiments of the disclosure.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
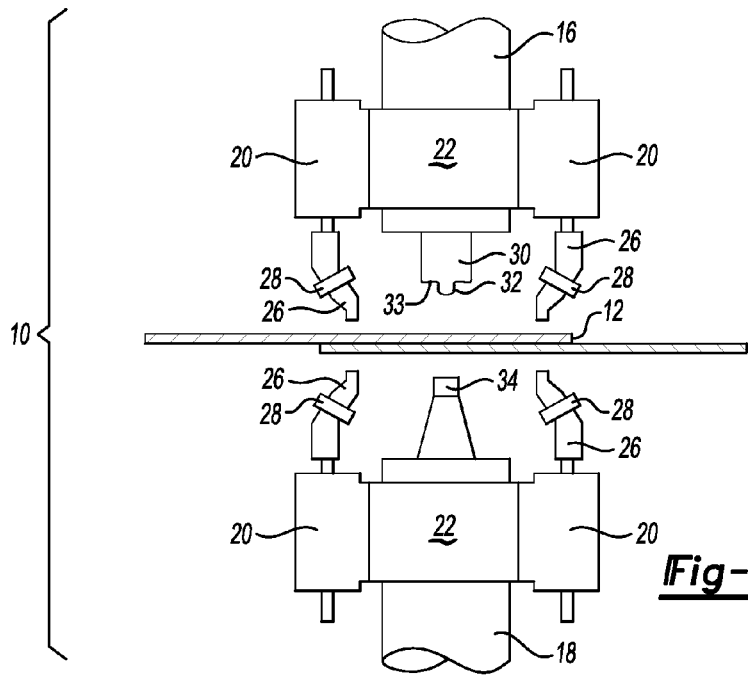
FIG. 1 is a diagrammatic elevation view of a friction stir welding tool that incorporates heating and clamping modules.

Referring to FIG. 1, a friction stir spot welding tool 10 is shown in position prior to joining two parts 12 together. A friction stir spot welding head 16 is shown disposed above the parts 12 and a friction stir spot welding anvil support 18 is shown below the two parts 12 in FIG. 1. It should be understood that the tool and parts may be oriented in any desired orientation and that the designations of being above or below the parts 12 should be construed to be positioned in any orientation with the parts 12 being disposed between the head 16 and anvil support 18.

As shown in FIG. 1, two clamping and heating modules 20 are attached to the head 16 and two clamping and heating module housings 20 are attached to the anvil support 18. An attachment fixture 22 is provided on the head 16 and anvil support 18. The clamping and heating module housings 20 are fastened to the attachment fixture 22 in a conventional manner.

The clamping and heating modules 20 include a stylus 26 that may be a copper member to which a heating element 28 is secured. The heating element 28 may be a resistance heating element, as shown, or may be an induction or laser-type heating element. The friction stir welding head 16 includes a rotary tool 30 that is used to rotate a pin 32 and shoulder 33 at a rapid rate of speed that are plunged into the parts 12 under pressure to create the friction stir spot weld. An anvil 34 is supported by the anvil support 18.

Figures 2, 3:
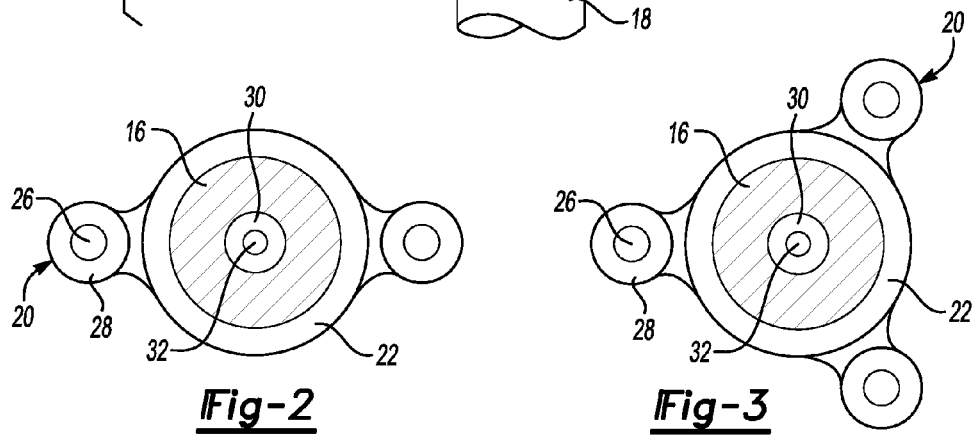
FIG. 2 is a bottom plan view of a friction stir welding head with two clamping and heating modules.
FIG. 3 is a bottom plan view of a friction stir welding head with three clamping and heating modules.
Figures 4, 5:
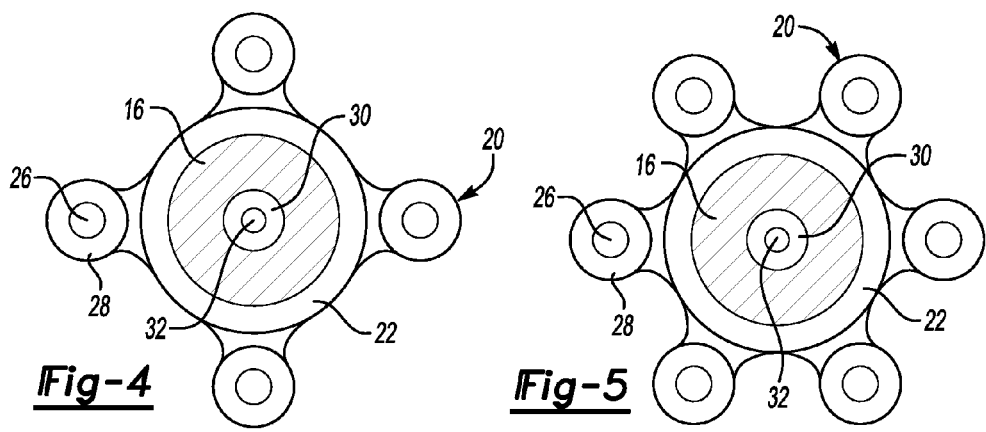
FIG. 4 is a bottom plan view of a friction stir welding head with four clamping and heating modules.
FIG. 5 is a bottom plan view of a friction stir welding head with six clamping and heating modules.

Referring to FIGS. 2-5, several different embodiments of the friction stir spot welding head 16 is shown with different numbers of clamping and heating modules 20. FIG. 2 illustrates two clamping and heating modules 20 secured to an attachment fixture 22. The attachment fixture 22 is attached to the head 16. The head 16 rotates the tool 30 that includes the pin 32 and shoulder 33 to perform the friction stir spot welding process. FIG. 3 includes three clamping and heating modules 20. FIG. 4 includes four clamping and heating modules 20, and FIG. 5 includes six clamping and heating modules 20.

Figure 6:
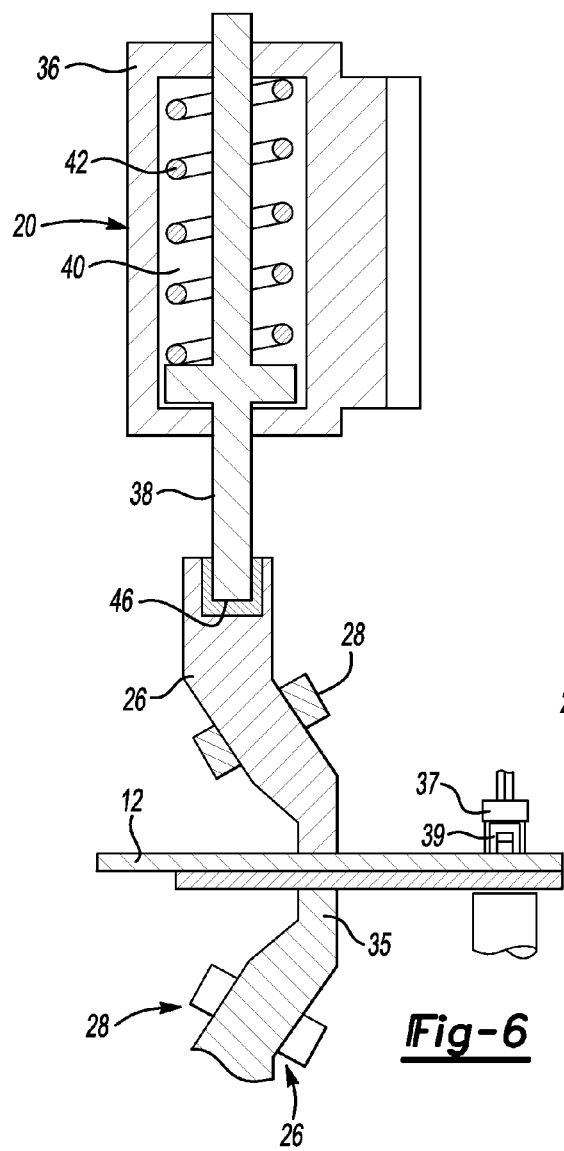
FIG. 6 is a diagrammatic cross-sectional view of a clamping and heating module with a self-piercing rivet tool and self-piercing rivet as it initially contacts parts to be joined.

Referring to FIG. 6, a clamping and heating module 20 is shown in a diagrammatic cross-section with a riveting tool 37 that is used to insert a self-piercing rivet 39. An anvil 35 is provided on the opposite side of the parts 12 to be joined from the stylus 26. The anvil 35 backs up the parts 12 and provides a clamping force between the anvil 35 and the stylus 26 that holds the parts 12 together. The clamping and heating module 20 includes a housing 36 that receives a piston 38 within a cavity 40, or bore, that is defined by the housing 36. A spring 42 is disposed within the cavity 40 that exerts a biasing force on the piston 38. The biasing force exerted on the piston 38 biases the stylus 26 into engagement with the parts 12. The stylus 26 is connected to the piston 38. An insulator 46 is provided between the stylus 26 and the piston 38 that thermally insulates the stylus 26 from the piston 38. The heating element 28 heats the stylus 26 to a temperature of between 50° and 100° C. The heated stylus 26 contacts the parts 12 and heat is conducted from the stylus 26 to the parts 12 to facilitate the self-piercing riveting operation by pre-heating the parts 12 prior to insertion of the self-piercing rivet 39.

The friction stir spot welding anvil support 18 shown below the parts in FIG. 1 includes two clamping and heating modules 20, as illustrated, that are substantially similar in construction to the clamping and heating modules 20 shown in FIG. 6.

Figure 7:
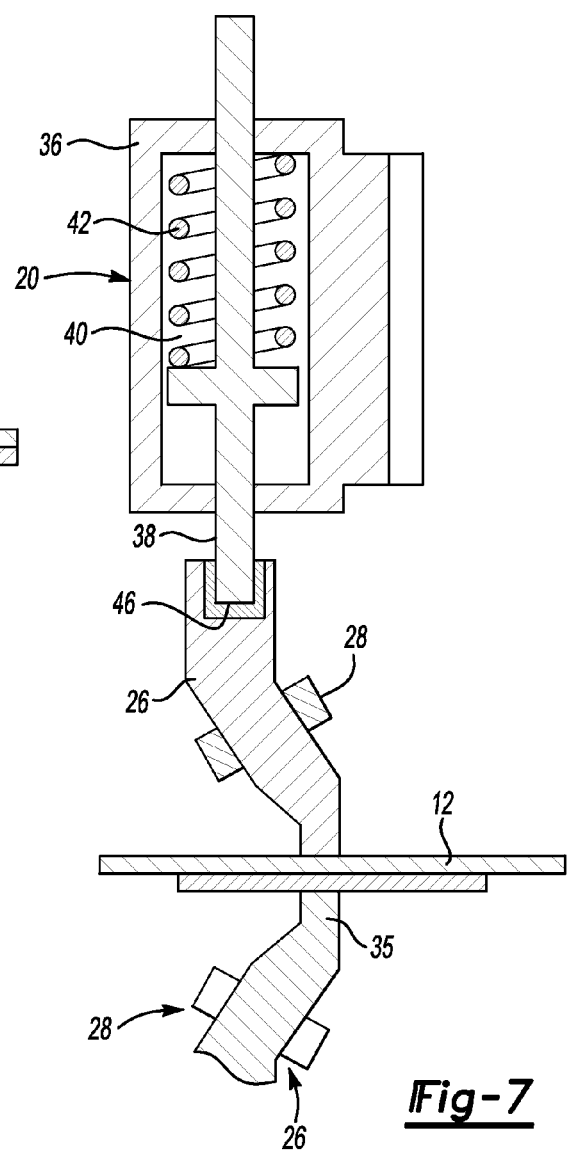
FIG. 7 is a diagrammatic cross-sectional view of a clamping and heating module shown applying a clamping force on parts to be joined.

Referring to FIG. 7, the clamping and heating module 20 is shown applying a clamping force to the parts 12. The stylus 26 is heated by the heating element 28 and is applying a clamping force to the parts 12. The piston 38 compresses the spring 42 as the housing 36 is driven in the Z-direction toward the stylus 26. The spring 42 exerts a biasing force through the piston 38, insulator 46 and stylus 26 against the parts 12. The anvil 35 backs up the parts 12 resulting the parts 12 being clamped between the anvil 35 and the stylus 26.

Figure 8:
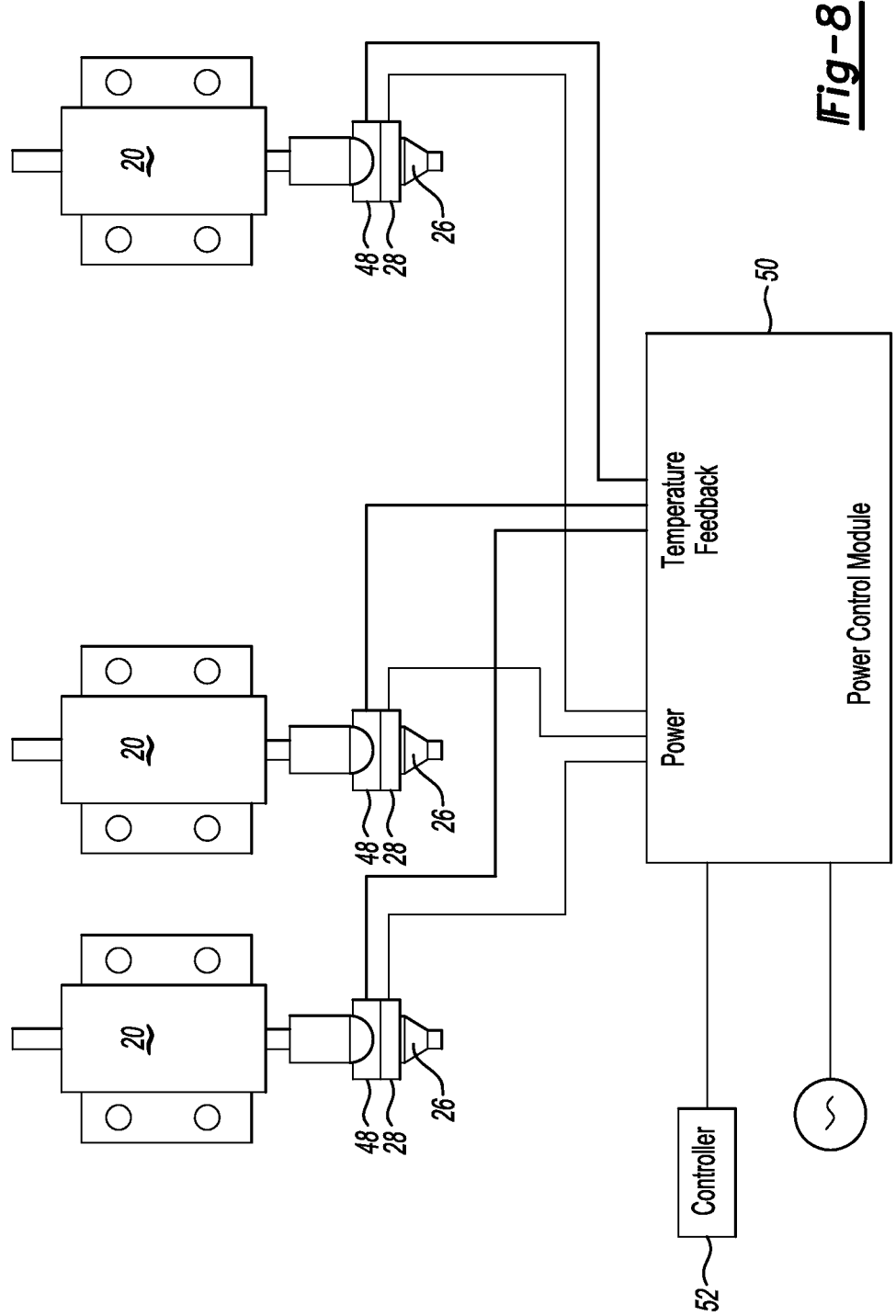
FIG. 8 is a schematic diagram of a friction stir welding heating and clamping module connected to a controller and a power control module.

Referring to FIG. 8, the three heating and clamping modules 20 are shown with a thermistor 48 (or a temperature sensor) is shown disposed on the stylus 26. The thermistor 48 is used to provide temperature feedback to a power control module 50. The power control module 50 provides power to the heating element 28 to control the temperature of the stylus 26. The power control module is also operatively connected to a controller 52. The controller 52 may be used to control other aspects of the operation of the friction stir spot welding tool 10. The controller 52 may control the operation of the friction stir spot welding head and clamp the parts 12 between the head 16 and the anvil support 18.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus, for joining parts together using a tool having a head, comprising:
   a housing attached to the head and including a piston;
   a clamping stylus attached to the piston and configured to engage one of the parts at a spaced location from the tool;
   a heating element provided on the stylus and configured to heat the one part to facilitate joining the parts; and
   a thermal insulator disposed between the stylus and the piston.

2. The apparatus of claim 1 wherein the tool is a friction stir spot welding tool.

3. The apparatus of claim 2 further comprising an anvil disposed on an opposite side of the one part from the head.

4. The apparatus of claim 3 further comprising:
   a back-up housing attached to a back-up of the tool, wherein the back-up includes the anvil;
   an oppositely oriented clamping stylus supported by the back-up housing and configured to engage with a second one of the parts at a spaced location from the back-up of the tool; and
   a heating element attached to the oppositely oriented clamping stylus that heats the oppositely oriented clamping stylus and the second one of the parts as the anvil cooperates with the tool to join the parts.

5. The apparatus of claim 1 wherein the tool is a self-piercing rivet tool.

6. The apparatus of claim 1 wherein the housing defines a cavity, and the piston is moveably disposed within the cavity, and wherein a spring is operatively connected to the piston to bias the clamping stylus into engagement with the one part.

7. The apparatus of claim 1 wherein the heating element is an electrical resistance heating element that heats the clamping stylus that in turn heats the one part by contacting the one part.

8. The apparatus of claim 1 further comprising at least one additional housing attached to the head, wherein the at least one additional housing includes a piston attached to an additional clamping stylus that is configured to engage with the one part at a spaced location from the tool, wherein the additional stylus includes a heating element.

9. The apparatus of claim 8 wherein the clamping stylus and the additional clamping stylus are arranged around the head of the tool such that adjacent styluses define a circumferential distance between the adjacent styluses, wherein the circumferential distance between each of the adjacent styluses is equal.

10. A tool for joining a plurality of parts together comprising:
    a spin stir spot welding head having a plurality of welding head clamps that are moved with the welding head to engage a first side of the plurality of parts, and having a heating element that heats the first side of the part that is contacted by the clamps, wherein the clamps are spring biased into engagement with the first side of the plurality of parts; and
    an anvil having a plurality of back-up clamps that are moved with the anvil to engage a second side of the plurality of parts and clamp the plurality of parts together when the plurality of parts are joined together, wherein the back-up clamps are spring biased into engagement with the second side of the plurality of parts.

11. The tool of claim 10 wherein the anvil further comprises a heating element that heats the second side of the plurality of parts.

12. The tool of claim 10 wherein the plurality of welding head clamps are arranged around the welding head such that each of the welding head clamps are spaced equidistant from the welding head and wherein the back-up clamps are arranged such that each back-up clamp is aligned with a respective one of the welding head clamps that is located on the opposite side of the plurality of parts.

13. The tool of claim 10 wherein the plurality of welding head clamps is six clamps disposed in a circular array around the spin stir spot welding head, and the plurality of back-up clamps is six back-up clamps that are each aligned with a respective one of the welding head clamps that is located on the opposite side of the plurality of parts.

14. The tool of claim 10 wherein a clamping force applied by each of the plurality of welding head clamps is less than 10% of a joining force applied by the spin stir spot welding head to the first side of the plurality of parts, and a back-up clamping force applied by each of the plurality of back-up clamps is less than 10% of a joining force applied by the anvil to the second side of the plurality of parts.

15. The tool of claim 10 further comprising at least one heating module including a housing defining a cavity and a piston moveably disposed within the cavity, wherein each at least one heating module includes a respective one of the springs disposed within the respective cavity, which spring engages between the respective piston and the respective housing, and each of the welding head clamps is attached to a respective one of the pistons.

16. A system for friction stir spot welding a plurality of parts together comprising:
    a friction stir spot welding head disposed to engage a first side of the plurality of parts;
    an anvil disposed on a second side of the plurality of parts that is opposite the first side of the plurality of parts;
    a plurality of welding head clamping members disposed around the friction stir spot welding head and each including a piston, and each including a stylus that engages the first side, wherein each of the welding head clamping members further includes a respective insulator that thermally insulates the respective stylus from the respective piston;

a plurality of back-up clamping members that are disposed around the anvil that engage the second side; and a plurality of heating elements each associated with a respective one of the welding head clamping members or a respective one of the back-up clamping members to heat the plurality of parts when the welding head clamping members and the back-up clamping members engage the plurality of parts with the friction stir spot welding head.

17. The system of claim 16 further comprising:

a power control module that provides power to each of the heating elements; and at least one temperature sensor that provides a feedback signal, that is indicative of the temperature of an associated one of the welding head clamping members or the back-up clamping members, to the power control module, wherein the power control module adjusts the power provided to the heating elements based upon the feedback signal.

18. The system of claim 17 wherein the power control module provides a control signal to another controller that is used by the system to control the operation of the friction stir spot welding head.

* * * * *